United States Patent [19]

Otsuka et al.

[11] 4,379,706
[45] Apr. 12, 1983

[54] SLIDABLE-TYPE CONSTANT VELOCITY UNIVERSAL JOINT

[75] Inventors: Nobuyuki Otsuka, Kawagoe; Seiichi Hirai, Sayama, both of Japan

[73] Assignee: Honda Giken Kogyo Kabushiki Kaisha, Tokyo, Japan

[21] Appl. No.: 214,289

[22] Filed: Dec. 8, 1980

Related U.S. Application Data

[63] Continuation of Ser. No. 958,820, Nov. 8, 1978, abandoned.

[30] Foreign Application Priority Data

Apr. 5, 1978 [JP] Japan .................................. 53-39254

[51] Int. Cl.³ .............................................. F16D 3/20
[52] U.S. Cl. ................................ 464/111; 464/124; 464/132; 464/905
[58] Field of Search ............... 464/111, 123, 124, 132, 464/905

[56] References Cited

U.S. PATENT DOCUMENTS

| | | | |
|---|---|---|---|
| 2,902,844 | 9/1959 | Rzeppa | 64/21 |
| 3,166,919 | 1/1965 | Kayser | 64/21 |
| 3,332,256 | 7/1967 | Mazziotti | 64/21 |
| 3,333,440 | 8/1967 | Sharp | 64/21 |
| 3,490,251 | 1/1970 | Roethlisberger | 64/8 |
| 3,613,396 | 10/1971 | Drevard et al. | 64/21 |
| 3,792,596 | 2/1974 | Orain | 64/21 |
| 3,817,057 | 6/1974 | Orain | 64/21 X |
| 3,818,721 | 6/1974 | Wahlmark | 64/8 X |
| 3,877,251 | 4/1975 | Wahlmark | 64/8 X |
| 3,930,378 | 1/1976 | Schmid | 64/8 |
| 4,083,202 | 4/1978 | Westercamp | 64/21 X |
| 4,091,641 | 5/1978 | Welschof | 64/21 |
| 4,192,154 | 3/1980 | Nakamura et al. | 64/21 |

FOREIGN PATENT DOCUMENTS 2461289 11/1975 Fed. Rep. of Germany .......... 64/21

*Primary Examiner*—John M. Jillions
*Assistant Examiner*—Daniel P. Stodola
*Attorney, Agent, or Firm*—Posnack, Roberts, Cohen & Spiecens

[57] ABSTRACT

A slidable type constant velocity universal joint comprising an outer member formed with at least three axially extending guide grooves disposed in parallel to one another, and an inner member disposed inside the outer member and provided with at least three radially extending pods projecting therefrom, the respective pods being in engagement, via respective rollers mounted thereon so as to be rotatable and slidable, within the respective guide grooves. The respective rollers are so mounted on the respective pods so as to be, additionally, tiltable in all directions so that the rollers will always be in longitudinally aligned relation in the guide grooves. Each pod is formed with an outer surface with curved generatrices and the surface can be, for example, a spherical surface of comparatively large curvature, and each roller can be formed with an inner surface supported on the pod surface via suitable bearings or guide rings for undergoing universal movement thereon.

9 Claims, 8 Drawing Figures

SLIDABLE-TYPE CONSTANT VELOCITY UNIVERSAL JOINT

This is a continuation of application Ser. No. 959,820 filed Nov. 8, 1978, now abandoned.

FIELD OF THE INVENTION

This invention relates to a tripod type of slidable constant velocity universal joint applied mainly to a front-engine, front-drive type motorcar.

PRIOR ART

FIG. 1 shows a known joint in which outer member a has a free end formed with at least three axially extending guide grooves b disposed in parallel to one another, and an inner member c has a free end which is disposed inside the outer member and is provided with at least three radially extending pods d projecting therefrom, the respective pods d being in engagement, via respective rollers e mounted thereon rotatably and slidably, with respective guide grooves b. If, with this arrangement, power transmission is effected under the condition that the outer member a and the inner member c are inclined to one another, each roller e and each guide groove b are brought into the inclined relation as shown in FIGS. 1 and 2, and in this condition each roller e does not roll properly in relation to the corresponding guide groove b and slippage takes place between the two surfaces. This is not desirable because it becomes a cause of power-loss, heat generation, vibration and the like.

U.S. Pat. No. 4,010,625 (Orain) is exemplary of the known construction and shows rollers slidably and rotatably mounted on respective pods.

SUMMARY OF THE INVENTION

An object of the invention is to provide a joint free from those disadvantages.

According to the invention, the universal joint comprises an outer member formed with at least three axially extending guide grooves disposed in parallel with one another, and an inner member disposed inside the outer member and provided with at least three radially extending pods projecting therefrom, the respective pods being in engagement, via respective rollers mounted on the pods so as to be rotatable and slidable within the respective guide grooves, the respective rollers being so mounted on the respective pods so as to be additionally pivotable in all directions.

DETAILED DESCRIPTION

Figure 1:
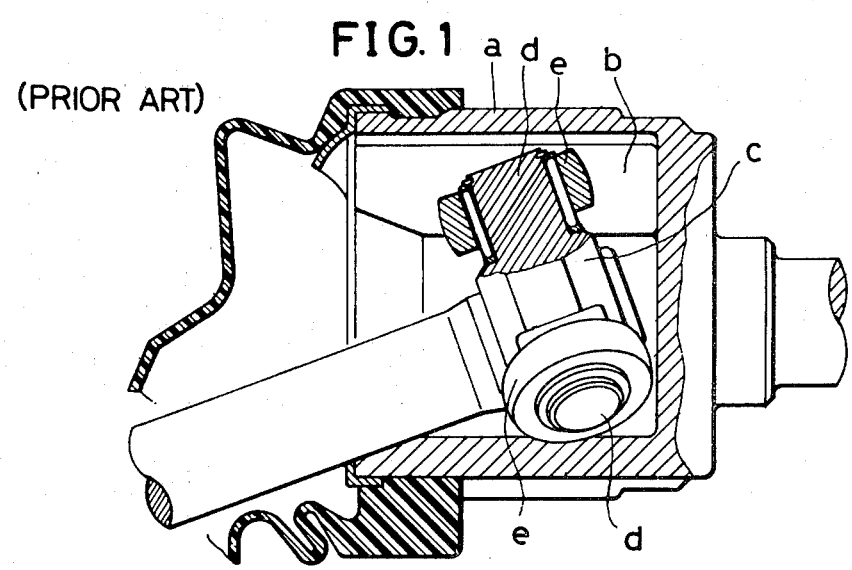
FIG. 1 is a side view, partly in section, of a conventional slidable type constant velocity universal joint.
Figure 3:
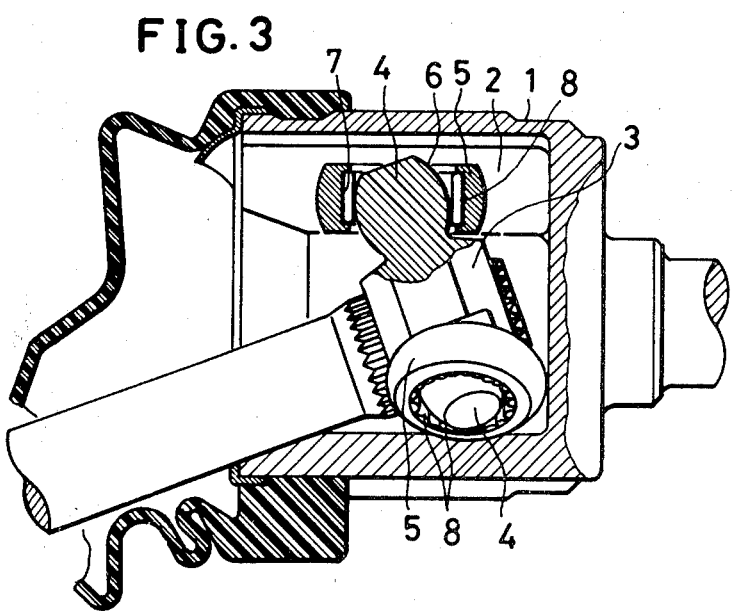
FIG. 3 is a sectional side view of one embodiment of a joint according to the invention.
Figure 2:
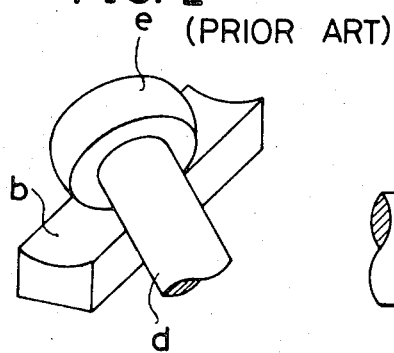
FIG. 2 is a perspective view of a portion thereof.
Figure 4:
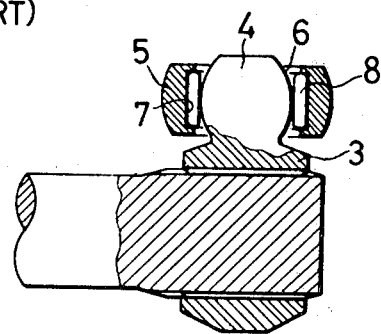
FIG. 4 is an enlarged sectional side view of a portion thereof.
Figure 5:
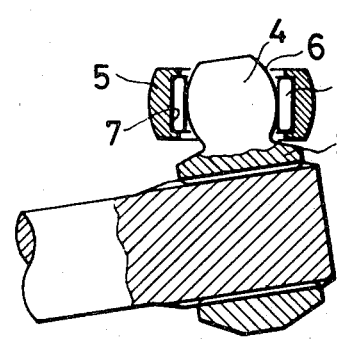
FIG. 5 is a sectional side view of the portion in its operative condition.

FIGS. 3 to 5 show one embodiment of a joint according to this invention.

Referring to these Figures, numeral 1 denotes an outer member having a free end of cylindrical form which is formed at its inner peripheral surface with at least three longitudinally extending guide grooves 2 arranged parallel to one another. Numeral 3 denotes an inner member whose free end is engaged within the outer member.

The inner member 3 is provided with at least three radially extending pods 4 projecting therefrom, and the respective pods 4 carry respective rollers 5 mounted thereon rotatably and slidably. The pods are engaged via the rollers in the respective guide grooves 2.

The above arrangement differs from the conventional joint in the particular construction of the means by which the rollers are mounted on the pods which will now be described.

According to the invention, each of the respective rollers 5 is so constructed that it can be additionally inclined in any direction in relation to each corresponding pod 4, i.e. universally with respect to pod 4, in order that the respective rollers may remain in parallel relationship in their associated grooves.

FIGS. 3 and 4 show one embodiment of this invention. Referring to FIG. 4, each pod 4 is formed with an outer surface 6 of barrel shape having a circular generatrix of comparatively large radius of curvature, and each roller 5 is provided with an inner cylindrical surface 7. The two surfaces 6 and 7 are mounted together via a needle bearing 8. Thereby, each roller 5 is more or less free to incline in all directions in relation to the pod 4 as evident from FIG. 5, for instance, and accordingly when the outer member 1 and the inner member 3 are inclined with respect to one another, each roller 5 is automatically tilted with respect to its pod to remain aligned in the longitudinal direction of the corresponding guide groove 2 and maintain its proper rolling action along the groove.

Figure 6:
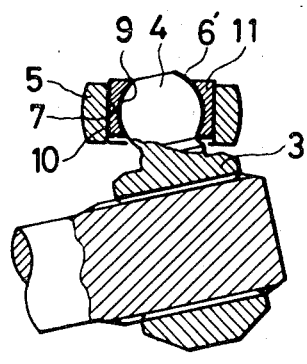
FIG. 6 is a sectional side view of a modified embodiment.

FIG. 6 shows a modified embodiment. This embodiment is similar to the previous embodiment except that each pod 4 is formed with an outer spherical surface 6'. Each roller 5 is formed with an inner cylindrical surface 7. The two surfaces 6', 7 are mounted together, however, via a guide ring 11 having an inner spherical surface 9 and an outer cylindrical surface 10 to enable each roller 5 to be universally inclined in relation to the pod 4.

Figure 7:
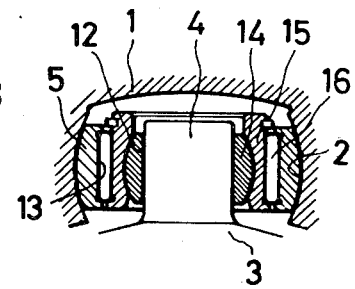
FIG. 7 is a sectional side view of another modified embodiment.

FIG. 7 shows another modified embodiment. Namely, in this embodiment, each pod 4 is formed with an outer cylindrical surface 12 and each roller 5 is formed with an inner cylindrical surface 13. The two surfaces 12, 13 are mounted together through inner and outer guide rings 14, 15 which have spherical surfaces in contact with one another and though a needle bearing 16 on the outer periphery of the outer ring 15 whereby each roller 5 can be tiltable in all directions.

Figure 8:
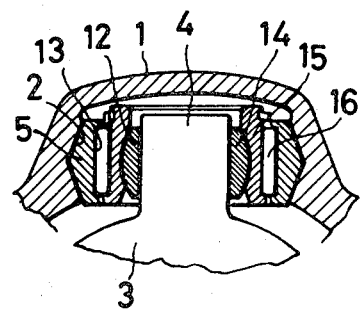
FIG. 8 is a sectional side view of a further modified embodiment.

In all of the foregoing embodiments, each roller 5 has curved generatrices which generate a curved surface which may, for example, approach or be spherical, and each guide groove 2 has an inner curved surface which in transverse section is substantially in conformity with the curved generatrix surface of the roller. The contact surfaces of the roller 5 and groove 2 however, are not limited to the particular curved shape but can be of any desired shape. For instance, as shown in FIG. 8, the roller 5 and groove 2 have mutually shaped surfaces which are V-shape in section.

The operation of the joint will now be explained as follows:

As is not especially different from the conventional embodiments, by rotating either the inner or outer member 5, the other is driven in rotation in accordance therewith and thus a constant velocity power transmission is effected between the inner and outer members. When power transmission is effected with the inner and outer members inclined, according to this invention, each roller 5 is so tilted freely with respect to its pod so as to remain automatically in the longitudinal direction of each guide groove 2, and thus each roller 5 can roll in the corresponding guide groove 2 and there is no significant slipping between the roller and the guide groove.

Thus, according to this invention, each roller is arranged so as to be not only rotatable and slidable but also tiltable in all directions on its pod, so that each roller is always automatically so compensated in its direction as to be properly aligned in the longitudinal direction of each guide groove, and thus the deficiencies in the conventional construction which arise when the inner and outer members are inclined are overcome.

What is claimed is:

1. A slidable constant velocity universal joint comprising inner and outer members having free ends which are interengaged, said outer member having three axially extending grooves disposed parallel to one another, said inner member including three radially projecting pods, a roller slidably received on each pod for movement axially thereof and rollably engaged in a respective groove for transmitting rotatable drive between said members, said members having an axially aligned position and being relatively movable to provide relatively inclined positions of said members, and means supporting each roller on its associated pod for axial slidable movement, for universal pivotal movement and for rotation thereon so that when the inner and outer members are inclined with respect to one another the rollers are tilted and axially moved with respect to their respective pods and remain axially aligned in said grooves, said means including a universal pivoting mounting slidably mounted on each said pod and a roller bearing interposed between said roller and said universal pivotal mounting, each said roller and its associated groove having contact surfaces of conforming shape, said pod having an outer cylindrical surface, said roller having an inner cylindrical surface, said roller bearing being engaged with the cylindrical surface of the roller, said universal pivotal mounting comprising inner and outer guide rings, said inner guide ring being engaged with the cylindrical surface of the respective pod, said outer guide ring being engaged with said roller bearing, said guide rings having contact surfaces engaged with one another of spherical shape.

2. A universal joint as claimed in claim 1 wherein the surfaces of the roller and groove are curved in transverse cross-section.

3. A universal joint as claimed in claim 1 wherein the surfaces of the roller and groove are V-shape in transverse cross-section.

4. A universal joint as claimed in claim 1 wherein said inner guide ring has an inner cylindrical guide surface which is engaged with the outer cylindrical surface of the respective pod for slidable and rotatable movement.

5. A universal joint as claimed in claim 4 wherein said outer guide ring has an outer cylindrical surface engaged with said roller bearing.

6. A universal joint as claimed in claim 5 wherein said roller bearing comprises a needle bearing including a plurality of cylindrical rollers interposed between said cylindrical inner surface of said roller and said cylindrical outer surface of said outer guide ring.

7. In a constant velocity universal joint of the type including:
a cylindrical outer member having internal axially extending grooves, an inner member having radially extending pods, and roller assemblies slidable axially of said pods and supported thereon for universal pivoting movement, said roller assemblies being received within and movable axially along said axially extending grooves, each said roller assembly including an inner roller member slidable axially on said pod and having a spherical outer surface, and an outer roller member mounted with respect to said inner roller member such that said outer roller member can undergo universal pivoting movement on said inner roller member;
the improvement wherein:
each said roller assembly includes a roller bearing, said outer roller member having an inner surface constituting an outer race for said roller bearing, an intermediate roller member having an outer surface constituting an inner race for said roller bearing and having an inner spherical surface complementary to and engaged with said spherical outer surface of said inner roller member to be universally pivotable thereon, said roller bearing including needle rollers interposed between said inner and outer races, the slidable mounting of the inner roller member on its associated pod and the universal pivotable movement of the intermediate roller member on said inner roller member enabling said outer roller member to maintain axial alignment in its associated groove when said inner and outer members are inclined while the outer roller member is free to rotate on the intermediate roller member via said needle rollers.

8. The improvement as claimed in claim 7 wherein said surfaces constituting said inner and outer races for said needle rollers are cylindrical.

9. The improvement as claimed in claim 8 wherein said needle rollers are cylindrical and extend around said pod with their axes parallel thereto.

* * * * *